United States Patent [19]
Beavin et al.

[11] Patent Number: 6,081,799
[45] Date of Patent: Jun. 27, 2000

[54] EXECUTING COMPLEX SQL QUERIES USING INDEX SCREENING FOR CONJUNCT OR DISJUNCT INDEX OPERATIONS

[75] Inventors: Thomas Abel Beavin, Milpitas; Peter Hoa, Los Altos; Fen-Ling Lin; Hong Sang Tie, both of San Jose, all of Calif.

[73] Assignee: International Business Machines Corporation, Armonk, N.Y.

[21] Appl. No.: 09/305,552

[22] Filed: May 5, 1999

Related U.S. Application Data

[60] Provisional application No. 60/086,326, May 21, 1998.

[51] Int. Cl.[7] .................................................. G06F 17/30
[52] U.S. Cl. ...................................... 707/2; 707/3
[58] Field of Search ......................... 707/2, 3, 4

[56] References Cited

U.S. PATENT DOCUMENTS

| | | | |
|---|---|---|---|
| 5,222,235 | 6/1993 | Hintz et al. | 707/101 |
| 5,548,769 | 8/1996 | Baum et al. | 707/1 |
| 5,579,515 | 11/1996 | Hintz et al. | 707/7 |
| 5,706,495 | 1/1998 | Chadha et al. | 707/2 |
| 5,940,822 | 8/1999 | Haderle et al. | 707/3 |

*Primary Examiner*—Paul V. Kulik
*Attorney, Agent, or Firm*—Pretty, Schroeder & Poplawski, P.C.

[57] ABSTRACT

A method, apparatus, and article of manufacture for an index screening system. A query is executed to access data stored on a data storage device connected to a computer. In particular, while accessing one or more indexes to retrieve row identifiers, index matching predicates in the query are applied to select row identifiers and index screening predicates in the query are applied to eliminate one or more selected row identifiers.

24 Claims, 7 Drawing Sheets

EXECUTING COMPLEX SQL QUERIES USING INDEX SCREENING FOR CONJUNCT OR DISJUNCT INDEX OPERATIONS

PROVISIONAL APPLICATION

This application claims the benefit of U.S. Provisional Application No. 60/086,326, entitled "INDEX SCREENING," filed on May 21, 1998, by Thomas A. Beavin, et al., which is incorporated by reference herein.

CROSS-REFERENCE TO RELATED APPLICATION

This application is related to the following co-pending and commonly-assigned patent applications:

U.S. Pat. No. 5,706,495, entitled "ENCODED-VECTOR INDICES FOR DECISION SUPPORT AND WAREHOUSING", issued on Jan. 1, 1998, by Atul Chadha, et al., Application Ser. No. 08/921,197, entitled "ENCODING METHOD OF MEMBERS RELATED BY MULTIPLE CONCEPT OR GROUP HIERARCHIES AND IDENTIFICATION OF MEMBERS IN A CORPUS OR A DATABASE THAT ARE DESCENDANTS OF ONE OR MORE SELECTED CONCEPTS OR GROUPS FROM THE ENCODING," filed on Aug. 29, 1997, by Donald J. Haderle, et al., now U.S. Pat. No. 5,940,822; and Application Ser. No. 09/164,257, entitled "EFFICIENT PROCESSING OF PARENT CHILD RELATIONSHIP IN A RELATIONAL DATABASE MANAGER," filed Sep. 30, 1998, by Thuan Bui, et al., each of which is incorporated by reference herein.

BACKGROUND OF THE INVENTION

1. Field of the Invention

This invention relates in general to computer-implemented database systems, and, in particular, to executing complex SQL queries using index screening for conjunct or disjunct index operations.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

An index is an ordered set of references to the records or rows in a database file or table. The index is used to access each record in the file using a key and a RID or row location. The RID provides the physical location of a row (i.e., the page number and location within the page of a particular row). A key is one of the fields of the record or one of the attributes of a row. The key ensures that a row is unique.

With a direct access technique, an index is used to identify RIDs. Each RID is associated with a data page. Upon retrieving a RID, the direct access technique directly accesses the data page to retrieve the row identified by the RID. After this step of retrieving rows, a filter may be applied to the rows to eliminate some of them. However, because the filter is applied after the rows are retrieved, for the eliminated rows, the data pages were unnecessarily accessed. Therefore, there is a need in the art for improved index screening.

SUMMARY OF A PREFERRED EMBODIMENT OF THE DISCLOSURE

To overcome the limitations in the prior art described above, and to overcome other limitations that will become apparent upon reading and understanding the present specification, an embodiment of the present invention discloses a method, apparatus, and article of manufacture for a computer-implemented index screening system.

In accordance with the present invention, a query is executed to access data stored on a data storage device connected to a computer. In particular, while accessing one or more indexes to retrieve row identifiers, index matching predicates in the query are applied to select row identifiers and index screening predicates in the query are applied to eliminate one or more selected row identifiers.

BRIEF DESCRIPTION OF THE DRAWING

Referring now to the drawing in which like reference numbers represent corresponding parts throughout.

DETAILED DESCRIPTION

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
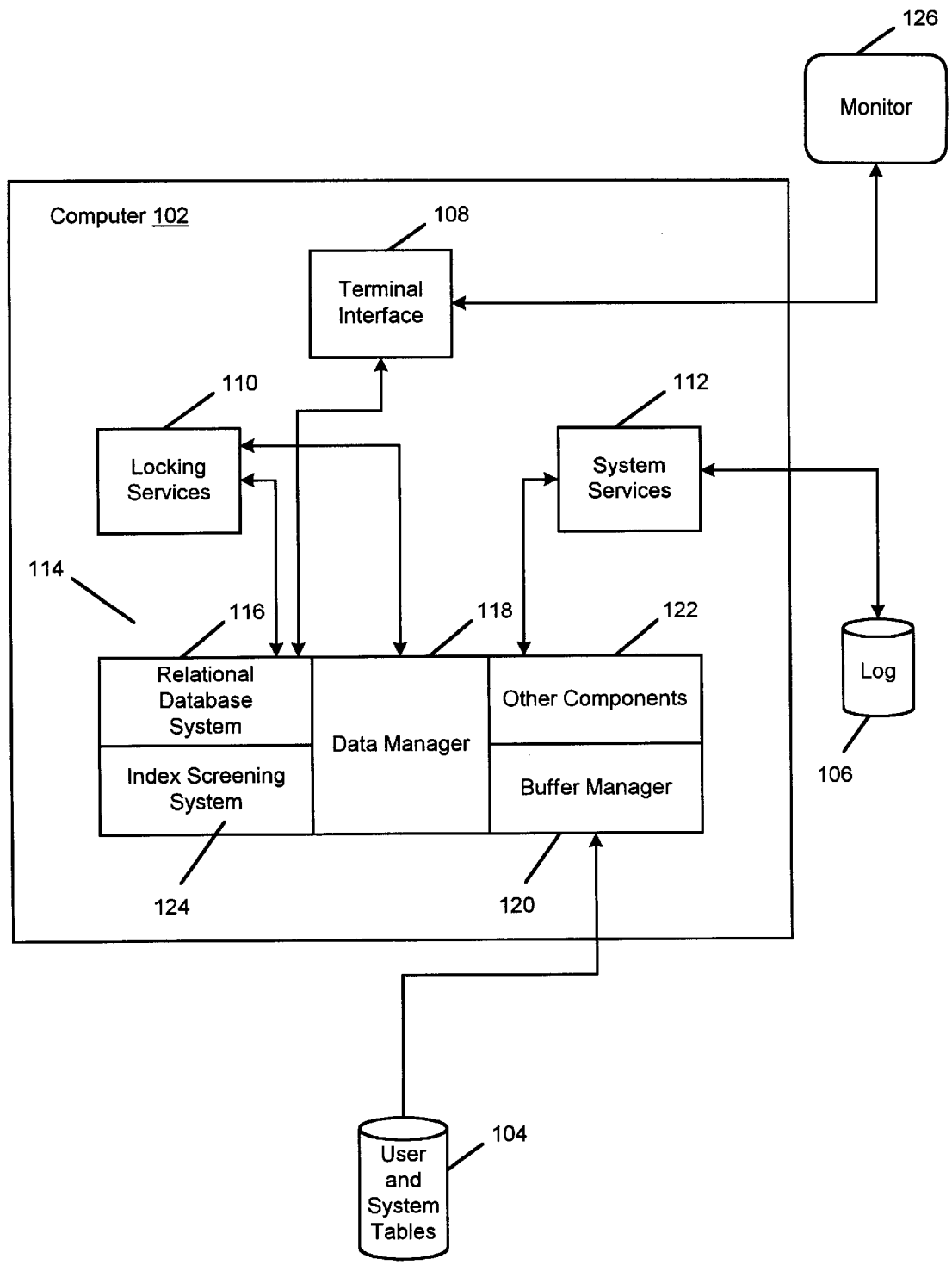
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, an Index Screening System 124, and other components 122 such as an SQL compiler/interpreter. These submodules support the functions of the SQL language, i.e. definition, access control, interpretation, compilation, database retrieval, and update of user and system data.

Generally, the RDBMS software, and the instructions derived therefrom, are all tangibly embodied in a computer-readable medium, e.g. one or more of the data storage devices 104 and 106. Moreover, the RDBMS software and the instructions derived therefrom, are all comprised of instructions which, when read and executed by the computer system 102, causes the computer system 102 to perform the steps necessary to implement and/or use the present invention. Under control of an operating system, the RDBMS software and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Index Screening

An embodiment of the invention provides an index screening system 124. The index screening system enables filtering rows of data prior to accessing the data pages on which they reside. The index screening system 124 filters rows based on RIDs while accessing an index. In particular, the index screening system 124 executes complex SQL queries using index screening for conjunct (e.g., "AND") or disjunct (e.g., "OR") index operations.

Figure 2:
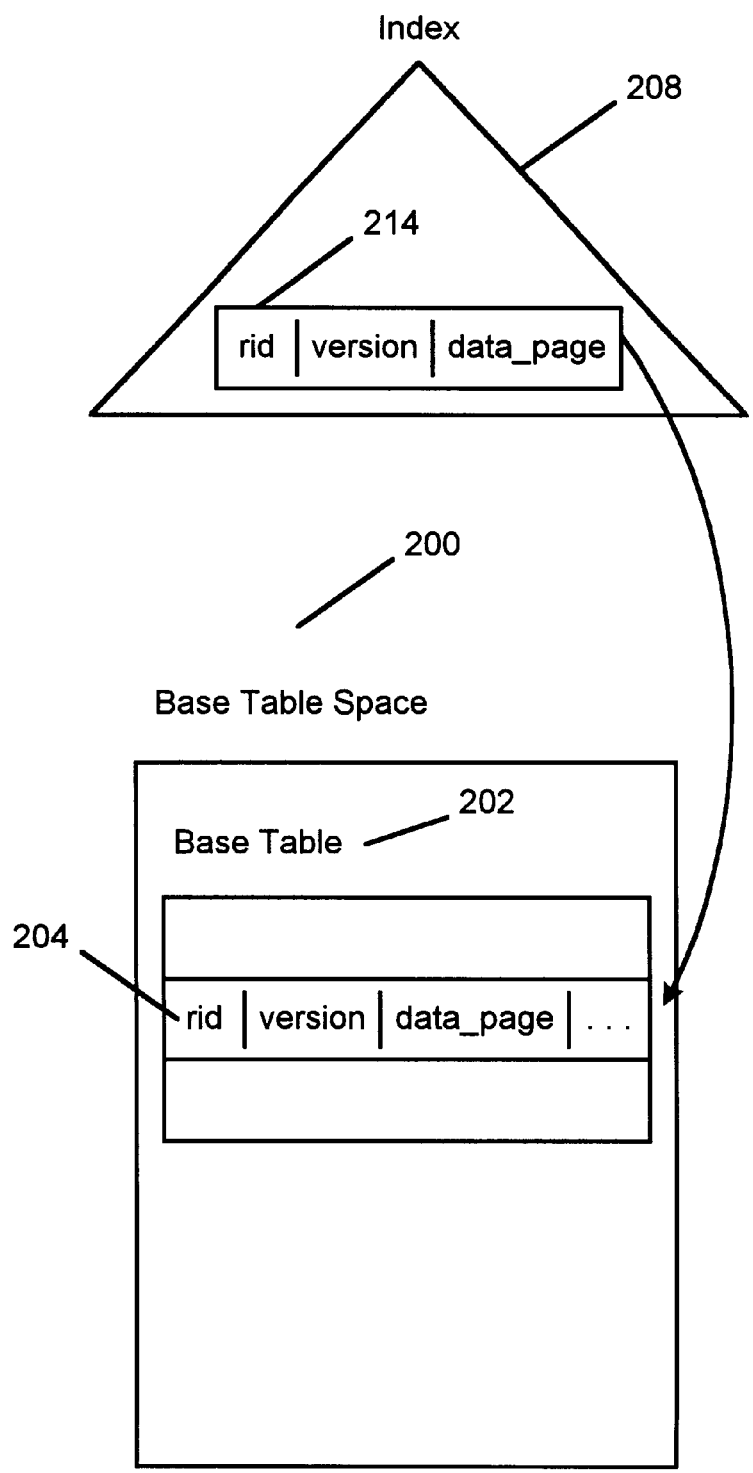
FIG. 2 is a block diagram illustrating an exemplary base table space.

FIG. 2 is a block diagram illustrating an exemplary base table space 200. A base table space 200 contains a base table 202. The base table 202 is a table definition that logically contains rows and columns of data. For example, row 204 contains columns for a row identifier ("RID"), a version number ("version), and other columns (indicated with the ellipses). An index 208 is created on the base table. The index 208 is used to quickly find a specific row in the table. In particular, the index 208 contains keys, such as key 214, which contains the row identifier, version number, and data page number containing that row. The key is used to index the base table 202. Indexing is also discussed in "ENCODED-VECTOR INDICES FOR DECISION SUPPORT AND WAREHOUSING", issued on Jan. 6, 1998, U.S. Pat. No. 5,706,495, to Atul Chadha, et al., which is incorporated by reference herein.

There are two new access techniques for accessing rows in a table. The following are the two table access techniques:

List Prefetch for single index access

Multiple index ANDing or ORing for multiple index access

List prefetch is an access technique that uses a single index. The list prefetch technique is used when an index is not highly clustered (e.g., less than 80% clustered). Using the list prefetch technique, qualified RIDs are collected into a list. The RIDs are sorted to group together RIDs that reference the same data page. After the list is created, the data pages associated with the RIDs are accessed only once.

Figure 3:
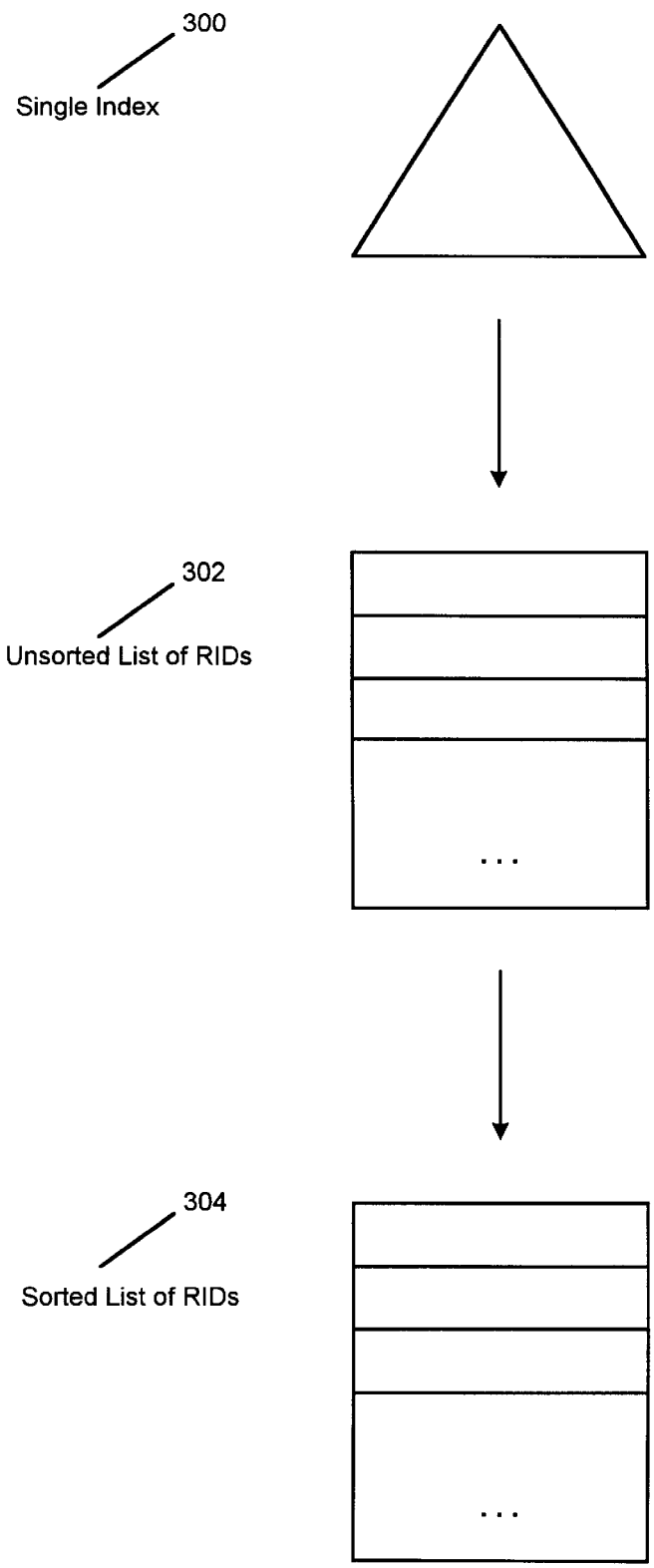
FIG. 3 is a block diagram illustrating the list prefetch technique.

FIG. 3 is a block diagram illustrating the list prefetch technique. The list prefetch technique uses a single index 300. Initially, the list prefetch technique builds an unsorted list of RIDs 302 using the index 300. Then, the list prefetch technique sorts the RIDs to generated a sorted list of RIDs 304. The sorting phase sorts the list of RIDs into groups of RIDs that access the same data page. Next, the list prefetch technique accesses data pages using the sorted list of RIDs 304.

Another access technique is multiple index ANDing or ORing for multiple index access, which will be referred to as the "multiple index technique" for discussion purposes. This multiple index technique applies the concepts of the list prefetch technique For ANDing, the RIDs from each of the multiple indexes are retrieved into separate lists of RIDs. The separate lists are "ANDed" together to form a single list of RIDs. The single list of RIDs is sorted to group together RIDs that reference the same data page, and the data pages referenced by the RIDs are accessed. For ORing, the RIDs from each of the multiple indexes are retrieved into separate lists of RIDs. Then, the separate lists are "ORed" together to form a single list of RIDs. The single list is sorted to group together RIDs that reference the same data page. Then the data pages referenced by the RIDs are accessed.

Figure 4:
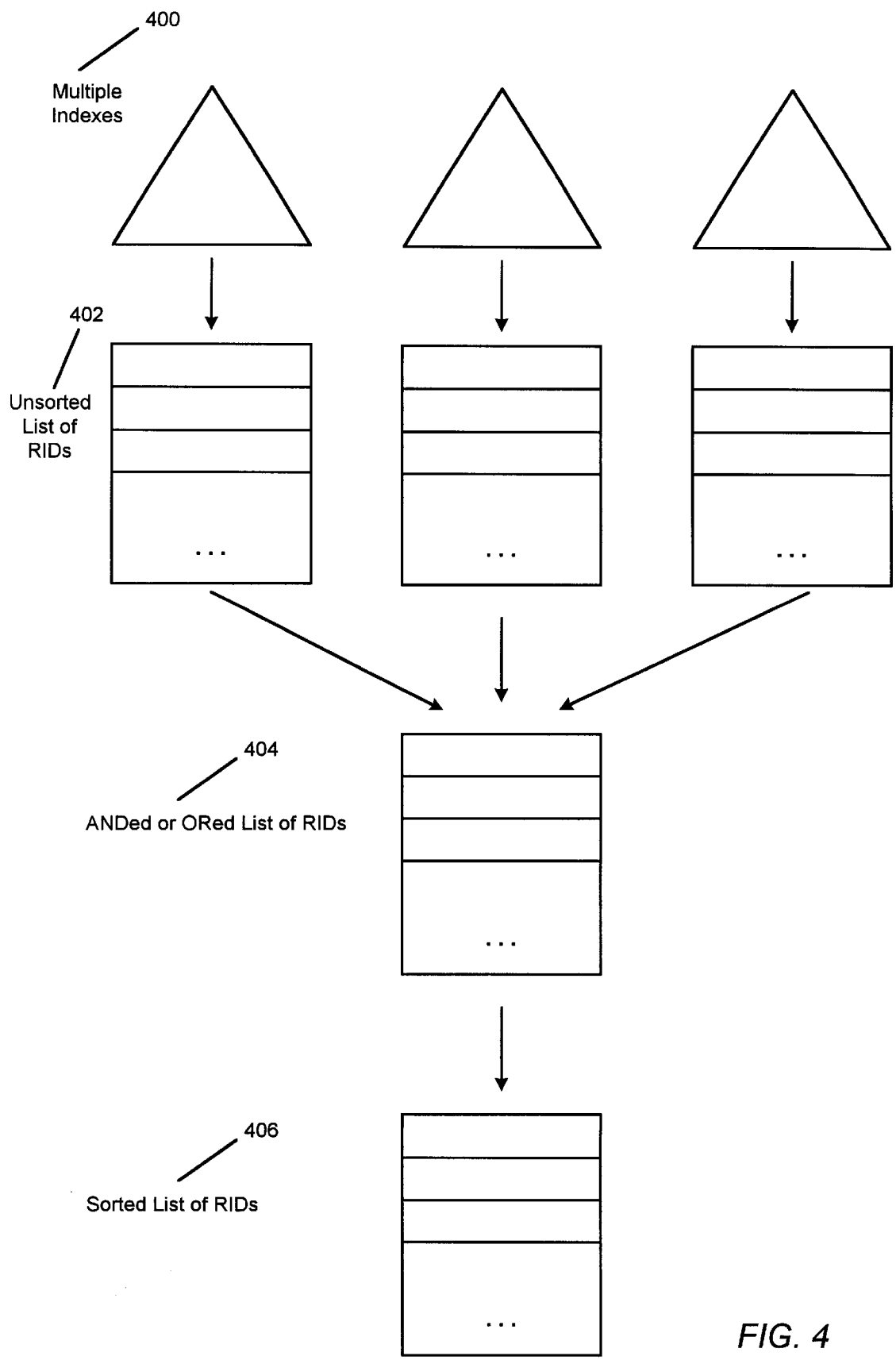
FIG. 4 is a block diagram illustrating the multiple index ANDing or ORing technique.

FIG. 4 is a block diagram illustrating the multiple index ANDing or ORing technique. The multiple index technique is used when multiple indexes 400 exist. For each index, the multiple index technique builds an unsorted list of RIDs 402. Then, the multiple index technique combines the multiple lists by ANDing, ORing, or both to generate a single list of unsorted RIDs 404. The multiple index technique sorts the RIDs in the unsorted list 404 to generate a sorted list of RIDs 406. Next, the multiple index technique accesses data pages using the sorted list of RIDs 406.

In conventional systems, no index screening has been supported for these access techniques. Index screening refers to screening out RIDs for rows that do not qualify for a query prior to accessing the data pages reference by the RIDs. The following represents an index definition in which columns C1, C2, C3, and C4 of a table are the columns of the index:

IDX(C1, C2, C3, C4)

The following represents a query that selects all rows from a CUSTOMERS table when the value of column C1 is 5, the value of column C2 is 'A', and the value of column C4 is 10:

SELECT*FROM CUSTOMERS WHERE C1=5 AND C2='A' AND C4=10

In a conventional system, the values of C1 and C2 are used during index access to eliminate RIDS, but the value of C4 is not used. In the conventional system, because column C3 is not used in the WHERE clause, the value of column C4 is ignored.

There are many users who would like index screening to be supported for RID access. Index screening for RID access results in performance improvements with the early rejection of unqualified RIDs via an index screening predicate, if present in the query.

One embodiment of the present invention enhances the optimizer to exploit the index screening predicates for access techniques for RID processing (e.g., list prefetch, multiple index access for a single table, and joins). That is, the index screening system 124 applies the value of column C4 to eliminate RIDs before the sorting and data page access phases. Thus, the index screening system 124 avoids passing an unqualified RID to the sorting phase and the data page access phase. Query performance is improved because the RID list to be sorted is often smaller and because there is no need to access the data pages for these eliminated RIDs.

The optimizer filter factor estimation will take into consideration the index screening performed for list prefetch to reflect the reduced I/O cost from data page reduction. The filter factor is the ratio of the potential result upon filtering out RIDs after data pages have been accessed.

The embodiment of the present invention is especially advantageous in that it provides significant improvement in performance due to index screening.

The following is a query that includes AND operators and an OR operator to select data from a table:

SELECT*FROM TABLE1 WHERE(C1>5 AND C3='A' AND C5=?)OR (C2=? AND C7=10)

Figure 5:
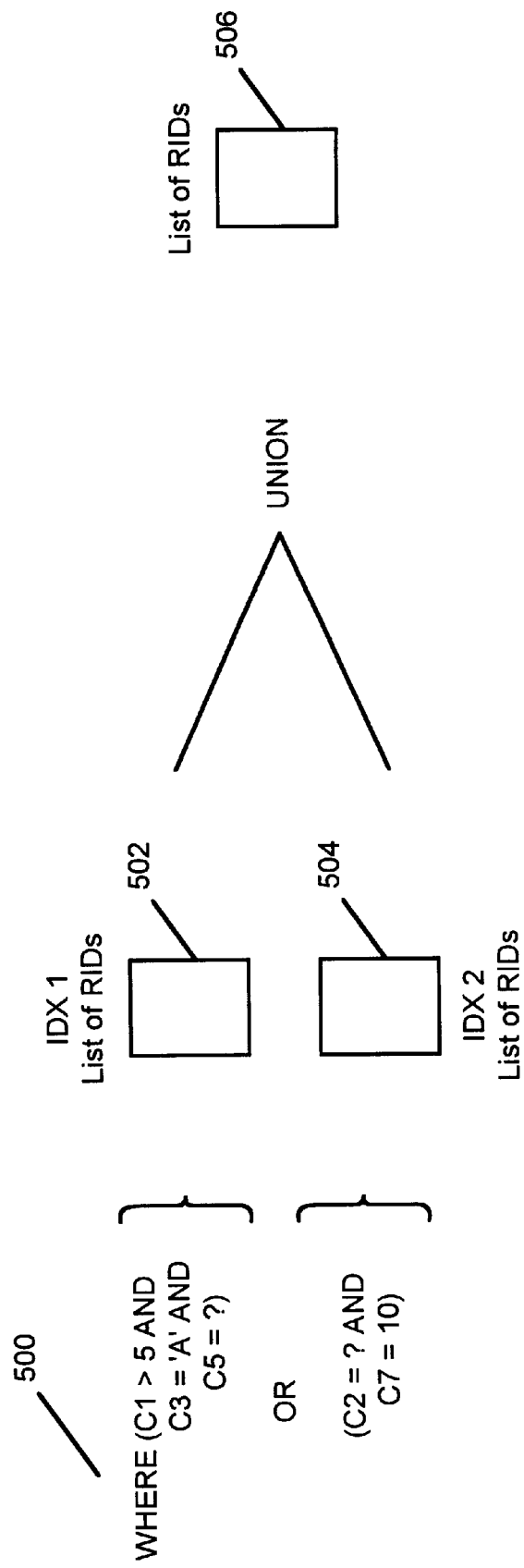
FIG. 5 is a block diagram illustrating the RID lists for a query.

FIG. 5 is a block diagram illustrating the RID lists for a query 500. For this example, one index (IDX 1) contains columns for C1, C2, and C3, and another index (IDX 2) contains columns for C2, C6, and C7. A list of RIDs 502 is generated using IDX1. The list of RIDs 502 represents the ANDing of columns C1, C3, and C5 (i.e., C1>5 AND C3='A' AND C5=?). Another list of RIDs 504 is generated using IDX2. The list of RIDs 504 represents the ANDing of columns C2 and C7 (i.e., C2=? AND C7=?). The index screening system 124 treats the OR as representing a union operation, which combines the two lists to generate a single list of RIDs 506. To process the OR operator, the index screening system 124 views a local piece of a parse tree generated by the parser as a virtual parse tree and assigns a BOOLEAN term node to the virtual parse tree.

Figure 6:
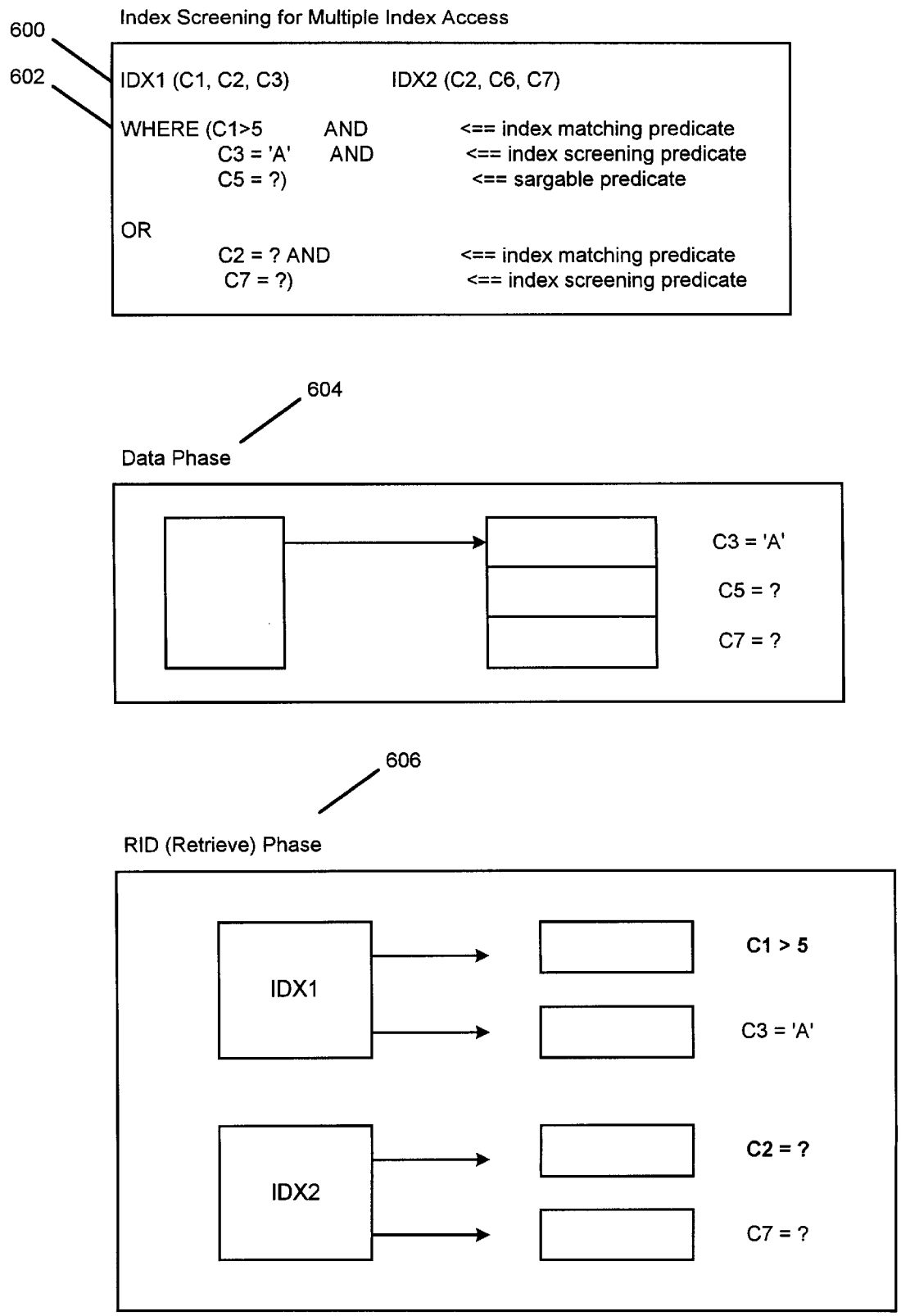
FIG. 6 is a block diagram illustrating the RID and Data phases of processing a query.

FIG. 6 is a block diagram illustrating the RID and Data phases of processing a query. In this example, there are two indexes 600: IDX1 is an index with columns C1, C2, and C3, and IDX2 is an index with columns C2, C6, and C7. The predicate 602 of a query contains several predicates. The test C1>5 is an index matching predicate, while the test C3='A' is an index screening predicate. With the index screening system 124, the matching and screening take place simultaneously as the index IDX1 is accessed. The test C5=? references a column, C5, which is not in the index, therefore, this test cannot be processed during the RID phase 606 (i.e., the RID phase accesses the index only). The question mark, "?", indicates that the column value can be any value. Moreover, the test C2=? is an index matching predicate, while the test C7=? is an index screening predicate.

During the data phase 604, data pages are accessed, rows are retrieved, and rows are eliminated by applying index screening predicates. In a conventional system, index screening predicates of C3='A' and C7=? would be applied during the data phase 604. However, it is more efficient to eliminate rows during the RID phase 606, before accessing data pages.

With the index screening system 124, the index screening predicates of C3='A' and C7=? would be applied during the RID phase 606. This would eliminate RIDs that otherwise would have been sent to the data phase. In particular, when IDX1 is accessed to retrieve rows, both the index matching predicate C1>5 and the index screening predicate C3='A' are simultaneously applied. When IDX2 is accessed, both the index matching predicate C2=? and the index screening predicate C7=? are simultaneously applied. In this manner, a number of rows are eliminated at the RID phase.

Figure 7:
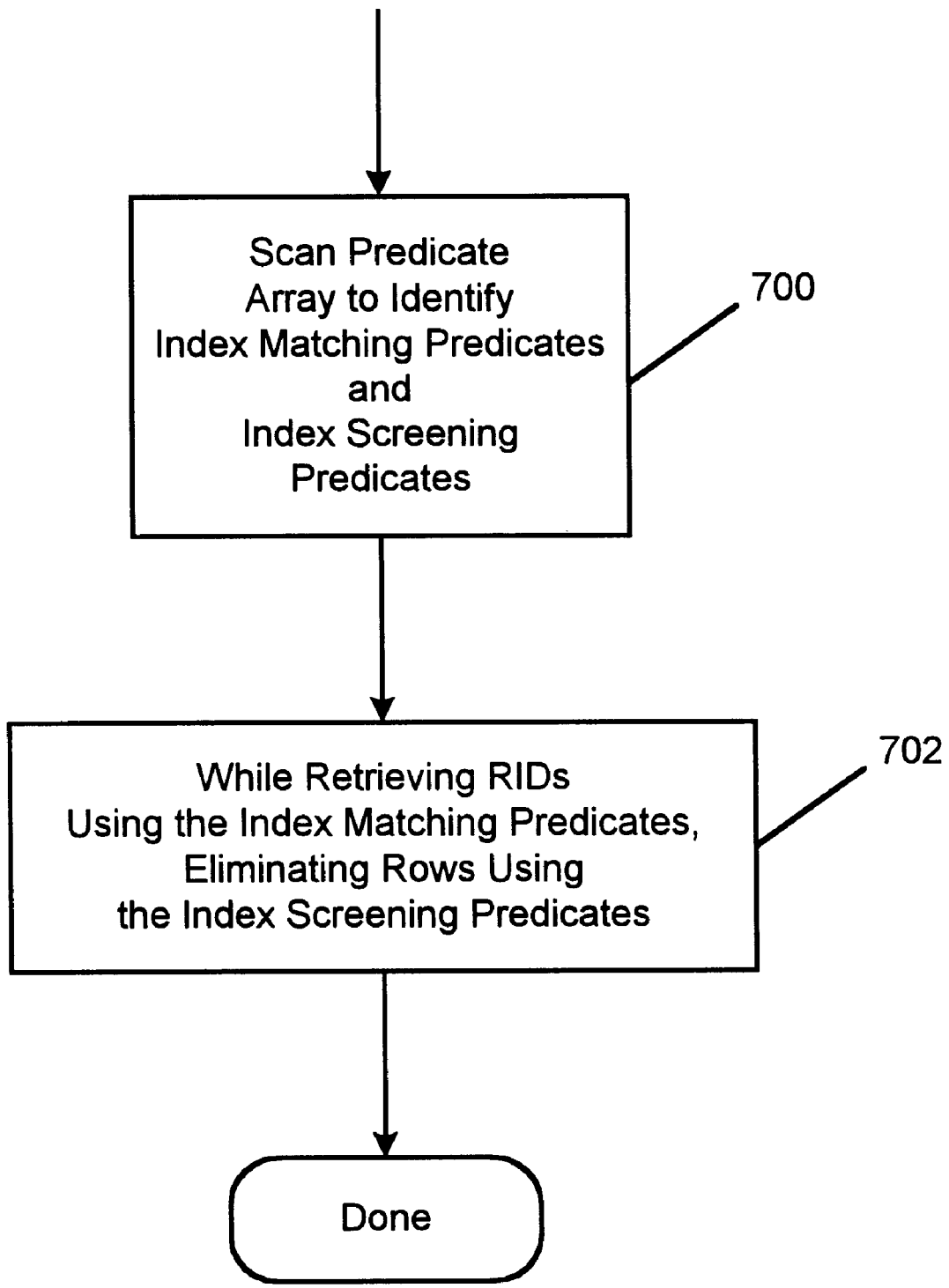
FIG. 7 is a flow diagram illustrating the steps performed by the index screening system.

FIG. 7 is a flow diagram illustrating the steps performed by the index screening system 124. In Block 700, the index screening system 124 scans a predicate array to identify index screening predicates and index matching predicates. The predicate array contains each of the predicates in a query. In block 702, while retrieving the RIDs from an index using the index matching predicates, the index screening system 124 eliminates rows using the index screening predicates.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query to access data stored on a data storage device connected to a computer, comprising the step of:
   while accessing one or more indexes to retrieve row identifiers,
      applying index matching predicates in the query to select row identifiers; and
      applying index screening predicates to eliminate one or more selected row identifiers.

2. The method of claim 1, further comprising the step of identifying index matching predicates in the query.

3. The method of claim 1, further comprising the step of identifying index screening predicates in the query.

4. The method of claim 1, further comprising the step of accessing the index with a list prefetch access technique.

5. The method of claim 1, further comprising the step of accessing each index with a multiple index technique.

6. The method of claim 5, wherein the multiple index technique comprises the step of performing an AND operation on the indexes.

7. The method of claim 5, wherein the multiple index technique comprises the step of performing an OR operation on the indexes.

8. The method of claim 7, wherein the step of performing the OR operation comprises the step of applying BOOLEAN logic to eliminate row identifiers in each index.

9. An apparatus for executing a query to retrieve data, comprising:
   a computer having a memory and a data storage device coupled thereto that stores the data;
   one or more computer programs, performed by the computer, for while accessing one or more indexes to retrieve row identifiers, applying index matching predicates in the query to select row identifiers and applying index screening predicates to eliminate one or more selected row identifiers.

10. The apparatus of claim 9, further comprising the means for identifying index matching predicates in the query.

11. The apparatus of claim 9, further comprising the means for identifying index screening predicates in the query.

12. The apparatus of claim 9, further comprising the means for accessing the index with a list prefetch access technique.

13. The apparatus of claim 9, further comprising the means for accessing each index with a multiple index technique.

14. The apparatus of claim 13, wherein the multiple index technique comprises the means for performing an AND operation on the indexes.

15. The apparatus of claim 13, wherein the multiple index technique comprises the means for performing an OR operation on the indexes.

16. The apparatus of claim 15, wherein the means for performing the OR operation comprises means for applying BOOLEAN logic to eliminate row identifiers in each index.

17. An article of manufacture comprising a program storage medium readable by a computer and embodying one or more instructions executable by the computer to perform method steps for executing a query to retrieve data stored on a data storage device, the method comprising the step of:
   while accessing one or more indexes to retrieve row identifiers,
      applying index matching predicates in the query to select row identifiers; and
      applying index screening predicates to eliminate one or more selected row identifiers.

18. The article of manufacture of claim 17, further comprising the step of identifying index matching predicates in the query.

19. The article of manufacture of claim 17, further comprising the step of identifying index screening predicates in the query.

20. The article of manufacture of claim 17, further comprising the step of accessing the index with a list prefetch access technique.

21. The article of manufacture of claim 17, further comprising the step of accessing each index with a multiple index technique.

22. The article of manufacture of claim 21, wherein the multiple index technique comprises the step of performing an AND operation on the indexes.

23. The article of manufacture of claim 21, wherein the multiple index technique comprises the step of performing an OR operation on the indexes.

24. The article of manufacture of claim 23, wherein the step of performing the OR operation comprises the step of applying BOOLEAN logic to eliminate row identifiers in each index.

* * * * *